June 14, 1960  C. JACQUET  2,940,504
MACHINES FOR THE MANUFACTURE OF PILE ARTICLES
Filed Feb. 14, 1956
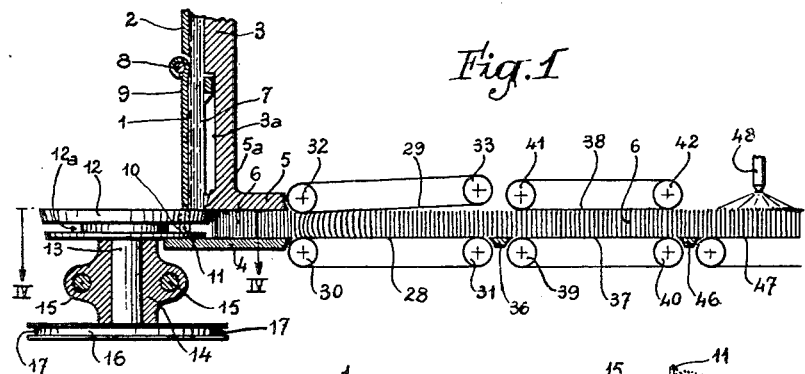
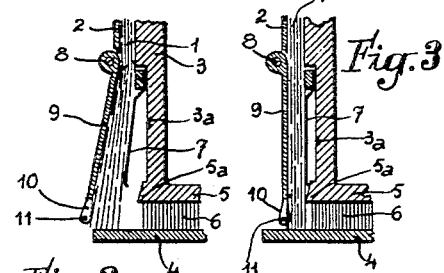 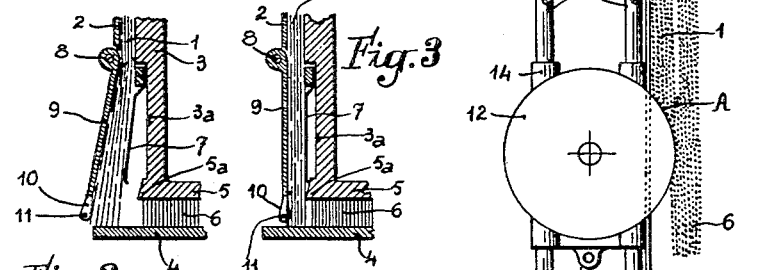 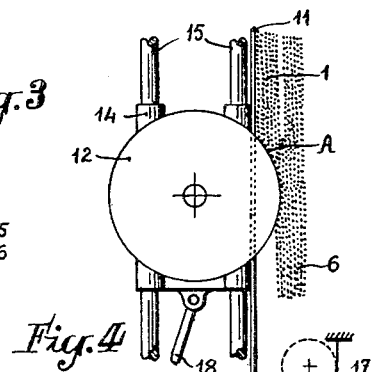
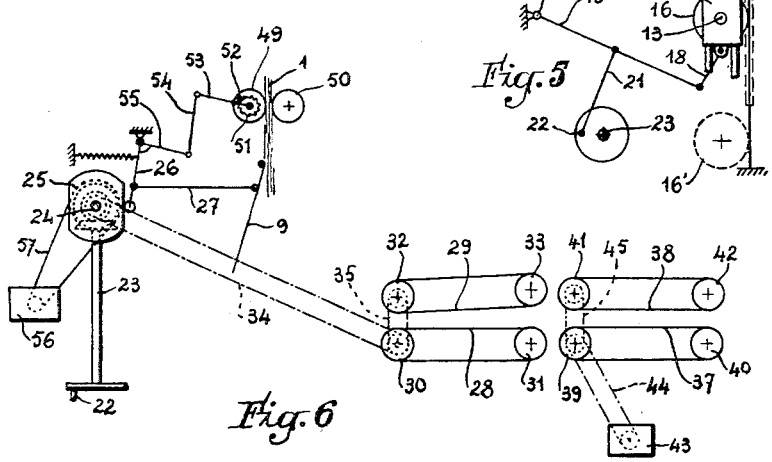
INVENTOR.
Camille Jacquet
BY Alexander Morrell
attorneys

United States Patent Office 2,940,504
Patented June 14, 1960

2,940,504

MACHINES FOR THE MANUFACTURE OF PILE ARTICLES

Camille Jacquet, Saint-Victor-de-Cessieu, France, assignor to Etablissements Giroud Freres, les Successeurs de Hugues Giroud & Cie, Vienne (Isere) France, a French limited-liability company Filed Feb. 14, 1956, Ser. No. 565,482

Claims priority, application France Feb. 22, 1955

6 Claims. (Cl. 154—1.1)

The present invention refers to the manufacture of pile articles by gluing onto a support a layer of fibres of substantially equal length formed by stacking successive transverse bands of erect fibres cut from a sheet of parallelized fibres.

The cutting of the successive transverse bands may be effected by means of a longitudinally reciprocatable cutter, for instance actuated by means of a crankshaft and connecting rod gearing. But in such a case the movable cutter blade should be more or less oblique with respect to the sheet and to the fixed cutter with which it cooperates. It results therefrom that the cutting point travels along the cutter blade from one edge of the sheet to the other edge thereof during the cutting operation and that when it reaches this latter edge the opposed end of the band which is being cut has already been pushed through a noticeable distance on the upper face of the fixed cutter. The band previously cut must therefore be spaced from the edge of the fixed cutter and it cannot form an abutment to retain the ends of the fibres being cut and to prevent same from falling horizontally during the cutting operation. This may be avoided by providing in front of the movable cutter a pusher member adapted to retain the fibres being cut while being itself pushed by the movable cutter, but such a pusher member necessitates a complicated actuating gearing and cannot be operated at a very high speed.

It has also been proposed to cut the successive bands by causing flat rollers to roll on the edge of a fixed transverse knife on which the sheet of parallelized fibres is passed, the said rollers being thereafter moved backwards to permit advance of the sheet. But this arrangement also requires a complicated and rather slow gearing for actuating the rollers transversely and longitudinally. Moreover means should be provided for maintaining the fibres being cut in order to prevent same from being displaced by the reaction of the cutting operation and from falling horizontally. Also the band which has been cut should be positively engaged into an appropriate guide in which the continuous layer of fibres is formed, and it should be retained therewithin against the reaction of this layer which tends to expand.

A first object of my invention is to provide a machine wherein the cutting operation of the successive bands may be effected by a transversely reciprocated cutter without any pusher member to retain the fibres in front of the band being cut.

Another object of my invention is to provide a machine wherein the band being cut is engaged into the guide by the movable cutter itself.

In accordance with my invention in a machine for the manufacture of pile articles by gluing onto a support a layer of erect fibres formed by engaging into an appropriate guide successive bands transversely cut from a sheet of substantially parallelized fibres, the successive bands are cut by means of a transversely reciprocated circular cutter which slides against the inner face of a corresponding fixed transverse rectilinear cutter forming one of the inlet walls of the said guide, the stroke of the said circular cutter being such that at both ends thereof it fully clears the sheet.

It will be appreciated that in my improved machine the sheet may be freely advanced at the end of each stroke of the movable cutter without having to move the said cutter backwards as in the known machines. Also, owing to the fact that the movable cutter slides against the inner face of one of the walls of the guide adapted to receive the layer of erect fibres, the fibres which are being cut by the said movable cutter are pushed by the latter and are therefore directly engaged into the said guide, which dispenses with any sort of separate pushing means. Owing to the longitudinal elasticity of the layer formed within the guide, the last band engaged thereinto by the movable cutter tends to return backwards, but the density of the layer is such that this backward movement of the said band is limited. The band substantially remains at the inlet of the guide where it forms an abutment retaining the fibres of the next band being cut to prevent these fibres from falling horizontally.

The movable circular cutter is preferably positively rotated during its stroke at such a speed that the portion of its periphery which is engaged with the fixed transverse cutter is substantially immovable transversely on the said fixed cutter, whereby any tendency of the movable cutter to displace the fibres laterally is avoided. The circular cutter is preferably driven by a pulley having substantially the same diameter as the cutting edge of the said circular cutter, the said pulley carrying a wire or cable which is wound thereon with its ends secured to the opposed sides of the machine.

My improved machine may further comprise a transverse wire or rod adapted to be pressed against the rear side of the band of fibres being cut to retain the fibres of this band and to prevent same from moving backwards during the cutting operation. The circular movable cutter is then grooved for housing the said wire or rod and for permitting the longitudinal movements thereof. The ends of this wire or rod may be secured to a rear clamping member adapted to be pressed against the sheet during the cutting operation to prevent same from swelling.

When it is desired to obtain pile articles with a relatively dense or thick pile, my improved machine preferably comprises a first pair of endless bands to positively advance the layer issuing from the guide at such a speed that the density of the said layer within the guide is not too high, while being sufficient for avoiding any discontinuity in the said layer. Means are thereafter provided to permit longitudinal compression of the layer until the density desired is obtained. The layer thus compressed is then caught between a second pair of endless bands and led to the gluing devices at a reduced speed.

In the annexed drawings:

Fig. 1 is a longitudinal section showing the essential members of a machine according to my invention.

Figs. 2 and 3 are fragmental sections similar to Fig. 1, but illustrating the parts at different steps during a cycle of the machine.

Fig. 4 is a horizontal section taken along line IV—IV of Fig. 1.

Fig. 5 is a very diagrammatical plan view illustrating the driving gear of the reciprocatable carriage which supports the circular cutter.

Fig. 6 is a diagrammatical elevation showing the general arrangement of the gearings which operate the other movable parts of the machine.

In Fig. 1 reference numeral 1 designates a sheet of longitudinally parallelized fibres which may be obtained by any appropriate means, as for instance by superimposing card webs, or by forming successive folds from such card webs. This sheet is movable vertically between appropriate guiding members 2, 3 above a horizontal table 4. A plate 5 is transversely disposed above table 4 at a small distance thereof to form therewith a horizontal guide for the layer 6 of vertical fibres cut from sheet 1, as thereafter explained. The said layer moves from left to right in Fig. 1 and consequently the left-hand edge of table 4 will be called rear edge, while its right-hand edge will be the front edge. As illustrated plate 5 terminates short of the rear edge of table 4 to permit passage of sheet 1 and the rear edge of the said plate 5 is appropriately sharpened to form a fixed cutter 5a extending transversely with respect to the machine. The front guiding member 3 extends downwardly to plate 5 but its rear side is recessed, as indicated at 3a, and in this recess there is disposed an elastic flap which is secured to member 3 by its upper end. The rear guiding member 2 terminates at a substantial height above table 4 and plate 5 and it carries at its lower end a traverse rod 8 on which there is articulated a clamping plate 9 adapted to press sheet 1 against flap 7. The lower edge of plate 9 is situated somewhat above the horizontal plane of the lower face of the fixed cutter 5a, but plate 9 extends downwardly in the form of the two lateral arms 10 to which are fixed the ends of a wire or rod 11 stretched at a very small distance above table 4.

The fixed cutter 5a cooperates with a movable circular cutter 12 carried by the upper end of a vertical shaft 13 rotatably supported by a carriage 14 which is slidable on a pair of transverse guiding rods 15. Cutter 12 is in the form of a frustro-conical member of small height with the apex of the cone situated downwardly, its upper face or larger basis is in contact with the lower face of the fixed cutter 5a, while its lower face or smaller basis is in contact or substantially in contact with table 4. Cutter 12 is grooved as indicated at 12a to provide a passage for the wire or rod 11. The lower end of shaft 13 carries a pulley 16 having substantially the same diameter as the upper face of cutter 12 and on this pulley there is wound a wire or cable 17 the ends of which are secured to the opposed sides of the machine, as indicated in Fig. 5.

Carriage 14 is transversely reciprocated on its guides 15 by any appropriate gearing, such as for instance a link 18 (Fig. 5) actuated by an arm 19 pivoted at 20 and oscillated by a rod 21, the latter being itself operated by a crankpin 22 carried by a vertical shaft 23. The arrangement is such that the length of the transverse stroke of carriage 14 is substantially greater than the width of sheet 1, as illustrated in Fig. 5 wherein 16' and 16" designate the positions of the pulley 16 at the end of the stroke of the said carriage.

Shaft 23 may itself be connected by bevel gears or the like with a transverse driving shaft 24 (Fig. 6) which carries a cam 25 actuating a lever 26 connected with the oscillatable clamping plate 9 by means of a link 27. Shaft 24 may be itself driven by an electric motor 56 through a chain 57.

Immediately in front of the outlet or front end of the guide formed by table 4 and plate 5 there is provided a pair of endless bands 28, 29 (Fig. 1) between which the layer 6 is caught as it issues from guide 4—5. The lower band 28 is carried by rollers 30, 31, its upper side being substantially in the horizontal plane of table 4. The upper band 29 is carried by rollers 32, 33, the arrangement being such that the vertical distance between the upper side of band 28 and the lower side of band 29 increases from the rear end of the said sides to the front end thereof in such a manner that the layer of erect fibres 6 is positively driven at the inlet end, but is substantially loose at the outlet end.

Bands 28, 29 are driven in synchronism with the movable cutter 12, as for instance by means of a chain 34 (Fig. 6) which connects a sprocket wheel carried by shaft 24 with another sprocket wheel keyed on the end of roller 30, rollers 30 and 32 being in turn connected by a chain 35.

A small table 36 is disposed in front of bands 28, 29 and in front of this table there is arranged another pair of endless bands 37, 38 between which the fibrous layer 6 is caught as it issues from the first pair of bands 28, 29. Bands 37, 38 are substantially parallel to each other, they are supported by rollers, respectively 39, 40 and 41, 42, and they are driven by means of an appropriate motor 43 (Fig. 6), as for instance through chains 44, 45.

The fibrous layer 6 issuing from bands 37, 38 passes over a table 46 (Fig. 1) and thence on a single endless band 47 above which there is disposed a spraying device 48 which distributes an appropriate solution, for instance of unvulcanized rubber (latex), to form on layer 6 a supporting film on which the pile fibres are glued. The article obtained is thereafter dried or vulcanized and wound on an appropriate collecting roller.

Sheet 1 is advanced downwardly by two rollers 49, 50 between which it is pressed, the said rollers operating in synchronism with the to and fro transverse movement of carriage 14. Roller 49 may for instance be in one with a ratchet wheel 51 actuated by a pawl 52 carried by an oscillating lever 53 which is connected by a link 54 with an arm 55 solid with lever 26.

The machine described operates as follows:

At the beginning of a cycle carriage 14 reaches one end of its stroke, for instance the end corresponding to the position 16' of pulley 16 in Fig. 5. The movable cutter 12 is thus quite disengaged from the sheet 1 of fibres to be cut. The clamping plate 9 is then oscillated rearwardly by cam 25, while rollers 49, 50 are actuated by pawl 52 and link 54, thus causing downward advance of sheet 1 the lower end of which comes into contact with table 4, as indicated in Fig. 2. It is to be noted that owing to the elasticity of flap 7 the lower part of sheet 1 is somewhat deviated rearwardly whereby it is spaced from the edge of the fixed cutter 5a and is prevented from interfering with fibres which could have been returned backwards farther than the said edge due to longitudinal expansion of the layer of fibres 6 within guide 4—5.

Clamping plate 9 is then returned forwardly by cam 25 and it presses sheet 1 against flap 7 the lower end of which is brought into contact with the oblique rear face of cutter 5a as indicated in Fig. 3. It is to be noted that at this position of the parts the lower transverse wire or rod 11 acts on the lower end of the fibres of sheet 1 immediately above table 4.

Carriage 14 then effects its transverse movement which brings pulley 16 from position 16' (Fig. 5) to position 16". During this movement pulley 16 is driven by wire or cable 17 and the circular cutter 12 rotates on itself. Wire or cable 17 being disposed on the front side of pulley 16, as shown, and the diameter of the said pulley being substantially equal to the diameter of the larger basis or upper face of cutter 12, the peripheral speed of the upper cutting edge of the said cutter is substantially equal to zero in the portion which engages the fixed cutter 5a. The lower portion of sheet 1 is thus cut without the fibers being displaced laterally and the transverse band of fibres thus cut is pushed forwardly by the circular cutter 12 itself and engaged into guide 4—5. Fig. 4 clearly illustrates the operation of cutter 12. In this figure A designates the fibres cut from sheet 1 and it is apparent that these fibres are pushed towards layer 6 of which they become a part. Behind cutter 12 layer 6 expands somewhat towards the rear without however the fibres substantially leaving guide 4—5.

It will be observed that during the cutting operation the fibres being cut are retained at the rear by wire or rod 11 and in front by layer 6 itself. The fibres being cut are thus prevented from rotating about the cutting edge of the fixed cutter 5a and from thereafter falling horizontally on table 4.

The layer 6 formed within guide 4—5 is advanced at each cycle under the action of the successive transverse bands engaged into the said guide. It issues from the latter and is caught between bands 28, 29 whereby it is advanced at a speed which is so adjusted that the density of the layer within guide 4—5 is not too high. It will easily be appreciated that if the speed of bands 28, 29 were too slow, the successive fibre bands would accumulate in guide 4—5 and become highly compressed longitudinally, and the last band cut from sheet 1 would be liable to be returned backwards beyond the rear edge of the fixed cutter 5a under the action of expansion of the compressed mass of fibres. On the other hand if the speed of endless bands 28, 29 were too high, the successive fibre bands would not be compressed at all and would not form a continuous layer.

The layer issuing from endless bands 28, 29 is caught between endless bands 37 and 38 which are driven at a substantially lower speed than bands 28, 29. Layer 6 is therefore compressed longitudinally in the outlet or front portion of bands 28, 29 where the latter are more spaced vertically from each other and thus leave the fibres substantially free. The density of the layer which reaches the last endless band 47 may thus be substantially higher than the density within guide 4—5.

I claim:

1. In a machine for the manufacture of pile articles by means of a layer of erect fibres formed by successive bands transversely cut from a sheet of substantially longitudinally parallelized fibres, a cutting table; a transverse rectilinear fixed cutter disposed in spaced parallel relation with respect to said table to form therewith a guide for the successive bands of fibres cut from said sheet; a transversely reciprocatable rotatable circular cutter adapted to cooperate with said fixed cutter, the cutting edge of said circular cutter sliding against the inner face of said transverse rectilinear fixed cutter to coact with the cutting edge of the latter to cut bands from said sheet, said circular cutter being in part engaged into the space formed between said rectilinear cutter and said table and having such a height with respect to the height of said space that it may push into said space each of said bands of fibres as it is cut from said sheet; means to reciprocate said circular cutter, said means imparting to said last-named cutter a stroke which is substantially greater than the width of the sheet of fibres to be cut; and means to advance the sheet of fibres to be cut transversely of said fixed cutter towards said table between the end positions of said circular cutter, said advancing means being so timed with respect to said cutter reciprocating means that said sheet is only advanced when it is clear of said circular cutter.

2. In a machine as claimed in claim 1, means to positively rotate said circular cutter at such a speed that the portion of the cutting edge thereof which is engaged with said rectilinear cutter is substantially immovable transversely of the machine.

3. In a machine as claimed in claim 1, said circular cutter being carried by a shaft rotatably supported by a reciprocatable carriage; said shaft also carrying a pulley having substantially the same diameter as the cutting edge of said circular cutter; and said pulley having wound thereon an elongated flexible member with the ends of said flexible member secured to the opposed sides of the machine and with the parts of said flexible member comprised between said pulley and said sides stretched transversely of said machine on the side of said pulley nearest to said fixed cutter, in such a manner that said circular cutter is positively rotated during its transverse stroke at such a speed that the portion of the cutting edge thereof which is engaged with said rectilinear cutter is substantially immovable transversely of the machine.

4. In a machine for the manufacture of pile articles by means of a layer of erect fibres formed of successive bands transversely cut from a sheet of substantially parallelized fibres, a cutting table; a transverse rectilinear fixed cutter disposed in spaced relation with respect to said table to form therewith a guide for the successive bands cut from said sheet; a transversely reciprocatable rotatable cutter of substantially frusto-conical form with a height substantially equal to the height of said guide, said circular cutter being engaged into said guide with its cutting edge in sliding engagement with cutting edge of said rectilinear fixed cutter, and said circular cutter being grooved on its frusto-conical periphery; means to successively advance said sheet towards said table transversely of said rectilinear cutter and substantially in contacting engagement with the cutting edge thereof; means to reciprocate said circular cutter transversely between two end positions situated beyond the edges of said sheet along the cutting edge of said rectilinear cutter, said last-named means being so timed that the advance of said sheet takes place each time said circular cutter is at one of said end positions; sheet clamping means to clamp said sheet close to the cutting edge of said rectilinear cutter on the side thereof opposed to said table, said clamping means releasing said sheet during the advance thereof; a longitudinally movable elongated transverse member of small cross section adapted to bear on the end of said sheet close to said table on the side of said sheet opposed to said rectilinear cutter, said member being passed through the groove of said circular cutter; and means to actuate said member in unison with said sheet advancing means in such a manner that it is returned backwards during the advance of said sheet.

5. In a machine as claimed in claim 4, said sheet clamping means comprising a plate movable longitudinally of the machine and adapted to bear on the side of said sheet opposed to said rectilinear cutter, said plate being formed with lateral arms disposed beyond the end positions of said circular cutter, and said elongated member being stretched between said arms.

6. In a machine for the manufacture of pile articles by means of a layer of erect fibres formed by successive bands transversely cut from a sheet of substantially longitudinally parallelized fibres, a cutting table; a transverse rectilinear fixed cutter disposed in spaced parallel relation with respect to said table to form therewith a guide for the successive bands of fibres cut from said sheet; a transversely reciprocatable rotatable circular cutter in the form of a frusto-conical member with the cutting edge formed along the periphery of the larger basis and with the vertical distance between the larger and the smaller basis substantially equal to the distance between said table and said rectilinear fixed cutter, the cutting edge of said circular cutter sliding against the inner face of said rectilinear fixed cutter to cooperate with the cutting edge of the latter, and said circular cutter being in part engaged into the space between said rectilinear fixed cutter and said cutting table; means to reciprocate said circular cutter, said means imparting thereto a stroke which is substantially greater than the width of the sheet of fibres to be cut; and means to advance the sheet of fibres to be cut transversely of said fixed cutter towards said table between the end positions of said circular cutter, said advancing means being so timed with respect to said circular cutter reciprocating means that said sheet is only advanced when it is clear of said circular cutter.

References Cited in the file of this patent

UNITED STATES PATENTS

| | | |
|---|---|---|
| 985,446 | Pease | Feb. 28, 1911 |
| 1,864,478 | Ward | June 21, 1932 |
| 2,500,690 | Lannan | Mar. 14, 1950 |